(12) United States Patent
Lin et al.

(10) Patent No.: US 11,972,587 B2
(45) Date of Patent: Apr. 30, 2024

(54) METHOD FOR ESTABLISHING SEMANTIC DISTANCE MAP AND RELATED MOVING DEVICE

(71) Applicant: VISUAL SENSING TECHNOLOGY CO., LTD., Hsinchu (TW)

(72) Inventors: Hsueh-Tse Lin, Hsinchu (TW); Wei-Hung Hsu, Hsinchu (TW); Shang-Yu Yeh, Hsinchu (TW)

(73) Assignee: FITIPOWER INTEGRATED TECHNOLOGY INC., Hsinchu (TW)

( * ) Notice: Subject to any disclaimer, the term of this patent is extended or adjusted under 35 U.S.C. 154(b) by 240 days.

(21) Appl. No.: 17/750,391

(22) Filed: May 22, 2022

(65) Prior Publication Data
US 2023/0360239 A1 Nov. 9, 2023

(30) Foreign Application Priority Data
May 5, 2022 (TW) .................................. 111116954

(51) Int. Cl.
G06T 7/521 (2017.01)
G05D 1/00 (2024.01)
G06T 1/00 (2006.01)
G06V 10/22 (2022.01)
G06V 20/50 (2022.01)
G06V 20/70 (2022.01)

(52) U.S. Cl.
CPC ............ *G06T 7/521* (2017.01); *G05D 1/0214* (2013.01); *G06T 1/0014* (2013.01); *G06V 10/225* (2022.01); *G06V 20/50* (2022.01); *G06V 20/70* (2022.01); *G06T 2207/10028* (2013.01)

(58) Field of Classification Search
CPC .................. G06T 7/521; G06T 1/0014; G06T 2207/10028; G05D 1/0214; G05D 1/0246; G05D 1/0274; G06V 10/225; G06V 20/50; G06V 20/70; G06V 10/26; G06V 20/56; A47L 11/4061
USPC .......................................................... 382/106
See application file for complete search history.

(56) References Cited

U.S. PATENT DOCUMENTS

| 11,604,967 | B2 * | 3/2023 | Smolyanskiy | .......... G06F 18/22 |
| 2018/0012370 | A1 * | 1/2018 | Aghamohammadi | ...................... G06F 18/251 |
| 2020/0209401 | A1 * | 7/2020 | Motoyama | ................ G06T 7/50 |

(Continued)

FOREIGN PATENT DOCUMENTS

| CN | 109682381 A | * 4/2019 | ............. G01C 21/20 |
| CN | 113228137 A | 8/2021 | |

(Continued)

*Primary Examiner* — Mahendra R Patel
(74) *Attorney, Agent, or Firm* — Winston Hsu

(57) ABSTRACT

An establishing method of semantic distance map for a moving device, includes capturing an image; obtaining a single-point distance measurement result of the image; performing recognition for the image to obtain a recognition result of each obstacle in the image; and determining a semantic distance map corresponding to the image according to the image, the single-point distance measurement result and the recognition result of each obstacle of in the image; wherein each pixel of the semantic distance map includes an obstacle information, which includes a distance between the moving device and an obstacle, a type of the obstacle, and a recognition probability of the obstacle.

16 Claims, 10 Drawing Sheets

Mapping table of coordinate-height-to-distance

(56) References Cited

U.S. PATENT DOCUMENTS

| | | | |
|---|---|---|---|
| 2020/0225673 A1* | 7/2020 | Ebrahimi Afrouzi | ........................ G05D 1/0044 |
| 2020/0326715 A1* | 10/2020 | Hurd | ......................... G06N 3/08 |
| 2020/0349846 A1* | 11/2020 | Siboni | .................. G06V 10/147 |
| 2020/0409387 A1* | 12/2020 | Tsurumi | ................ G05D 1/0219 |
| 2021/0049376 A1* | 2/2021 | Cui | ......................... G06N 20/00 |
| 2022/0044474 A1* | 2/2022 | Zhong | ..................... G06T 17/05 |
| 2022/0057806 A1* | 2/2022 | Guo | ........................ G06V 20/58 |
| 2022/0075074 A1* | 3/2022 | Kang | ..................... G01S 17/931 |
| 2022/0236075 A1* | 7/2022 | Ho | ...................... G01C 21/3837 |

FOREIGN PATENT DOCUMENTS

| | | | | |
|---|---|---|---|---|
| EP | 3712841 A1 * | 9/2020 | .............. | G06T 5/005 |
| TW | 201920982 A | 6/2019 | | |
| WO | WO-2021262943 A1 * | 12/2021 | ...... | B60W 60/00256 |
| WO | WO-2022000260 A1 * | 1/2022 | .............. | G06F 16/29 |
| WO | WO-2022066583 A1 * | 3/2022 | .......... | G01B 11/2513 |
| WO | WO-2022115766 A1 * | 6/2022 | ........... | B64C 39/024 |

* cited by examiner

METHOD FOR ESTABLISHING SEMANTIC DISTANCE MAP AND RELATED MOVING DEVICE

BACKGROUND OF THE INVENTION

1. Field of the Invention

The present invention relates to a method for establishing semantic distance map and related moving device, and more particularly, to a method for establishing semantic distance map and related moving device capable of precisely determining obstacles for performing sweeping.

2. Description of the Prior Art

Sweeping robots are commonly utilized in families. When in an operation of the sweeping robot, all kinds of obstacles should be avoided indoors. The conventional sweeping robot usually adopts a single lens camera for distance measurement, and performs the obstacle avoidance according to the measured distance. Therefore, the conventional sweeping robot directly avoids an obstacle when detecting the obstacle exists in the front, and cannot enter a bottom space of the obstacle for sweeping. Or, when the seeping robot cannot determine the height from the ground to the bottom of the obstacle, the seeping robot may directly hit the obstacle or get stuck when entering the bottom of the obstacle for sweeping.

Therefore, improvements are necessary to the prior art.

SUMMARY OF THE INVENTION

In light of this, the present invention provides a method for establishing semantic distance map and related moving device, which improves the ability of obstacle avoidance of the moving device when sweeping.

An embodiment of the present invention discloses an establishing method of semantic distance map for a moving device, comprises capturing an image; obtaining a single-point distance measurement result of the image; performing recognition for the image to obtain a recognition result of each obstacle in the image; and determining a semantic distance map corresponding to the image according to the image, the single-point distance measurement result and the recognition result of each obstacle of in the image; wherein each pixel of the semantic distance map includes an obstacle information, which includes a distance between the moving device and an obstacle, a type of the obstacle, and a recognition probability of the obstacle.

Another embodiment of the present invention discloses a moving device, comprises a monocular image capturing device, configured to capture an image; a non-contact range finding module, configured to obtain a single-point distance measurement result of the image; and a processing unit, coupled to the monocular image capturing device and the non-contact range finding module, configured to perform recognition for the image to obtain a recognition result of each obstacle in the image; and determine a semantic distance map corresponding to the image according to the image, the single-point distance measurement result and the recognition result of each obstacle of in the image; wherein each pixel of the semantic distance map includes an obstacle information, which includes a distance between the moving device and an obstacle, a type of the obstacle, and a recognition probability of the obstacle.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
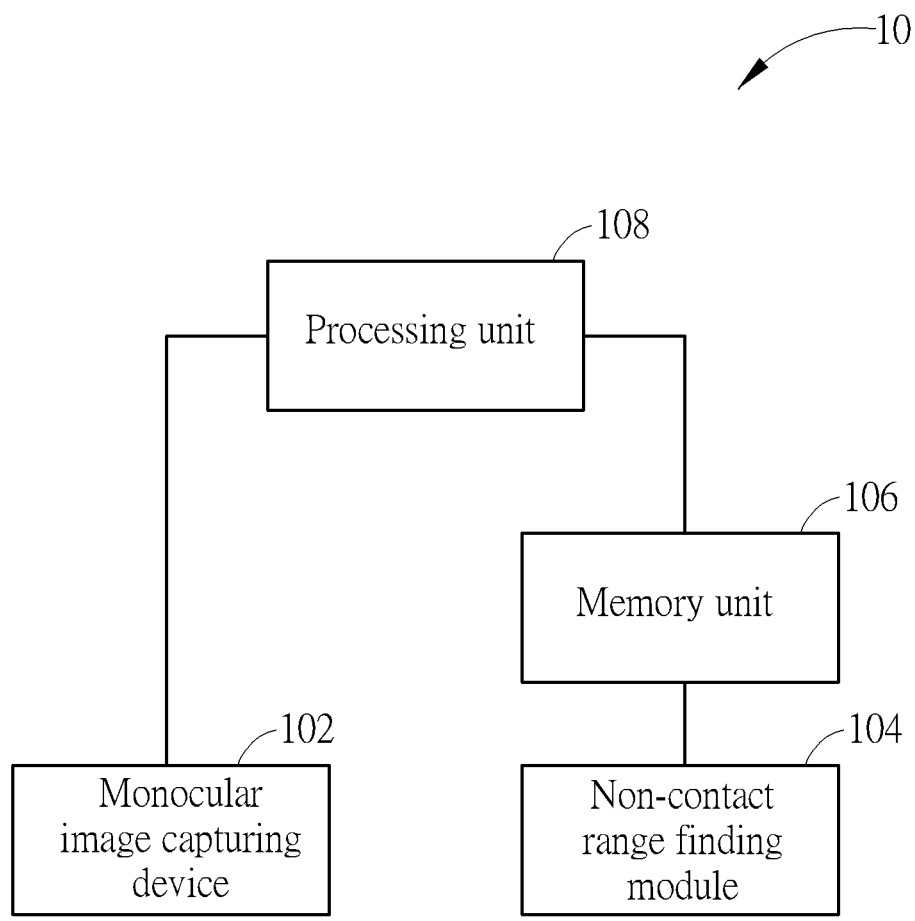
FIG. 1 is a schematic diagram of a moving device according to an embodiment of the present invention.

Please refer to FIG. 1, which is a schematic diagram of a moving device 10 according to an embodiment of the present invention. The moving device 10 includes a monocular image capturing device 102, a non-contact range finding module 104, a memory unit 106 and a processing unit 108. The moving device 10 may be a robot vacuum for sweeping ground of a space according to an indication of the processing unit 108. The monocular image capturing device 102 may be implemented on a front part of the moving device 10 for capturing an image in front of the moving device 10, e.g. a single-lens camera. The non-contact range finding module 104 may be a laser rangefinder, an infrared rangefinder or other optical single-point range finding module for obtaining a single-point distance measurement result, wherein the single-point distance measurement result may be a pixel distance in the image between a pixel location corresponding to a shooting location shot by a light source (e.g. a laser light source or an infrared light source) of the non-contact range finding module 104 and the moving device 10 according to the image captured by the monocular image capturing device 102. Since the non-contact range finding module 104 is installed on a fixed location of the moving device 10, the shooting location of light source of the non-contact range finding module 104 and the pixel location in the image captured by the monocular image capturing device 102 are fixed. In an embodiment, the non-contact range finding module 104 is configured to obtain the single-point distance measurement result of part of pixels or each pixel of the image. The processing unit 108 may be a processor with a processing ability for recognizing the image to obtain a recognition result of each obstacle in the obtained image, and determining a semantic distance map corresponding to the image according to the image, the single-point distance measurement result and the recognition result of obstacles in the image. Therefore, the moving device 10 according to an embodiment of the present invention may take the semantic distance map with obstacle information as a basis of a moving route of the moving device 10.

Figure 2:
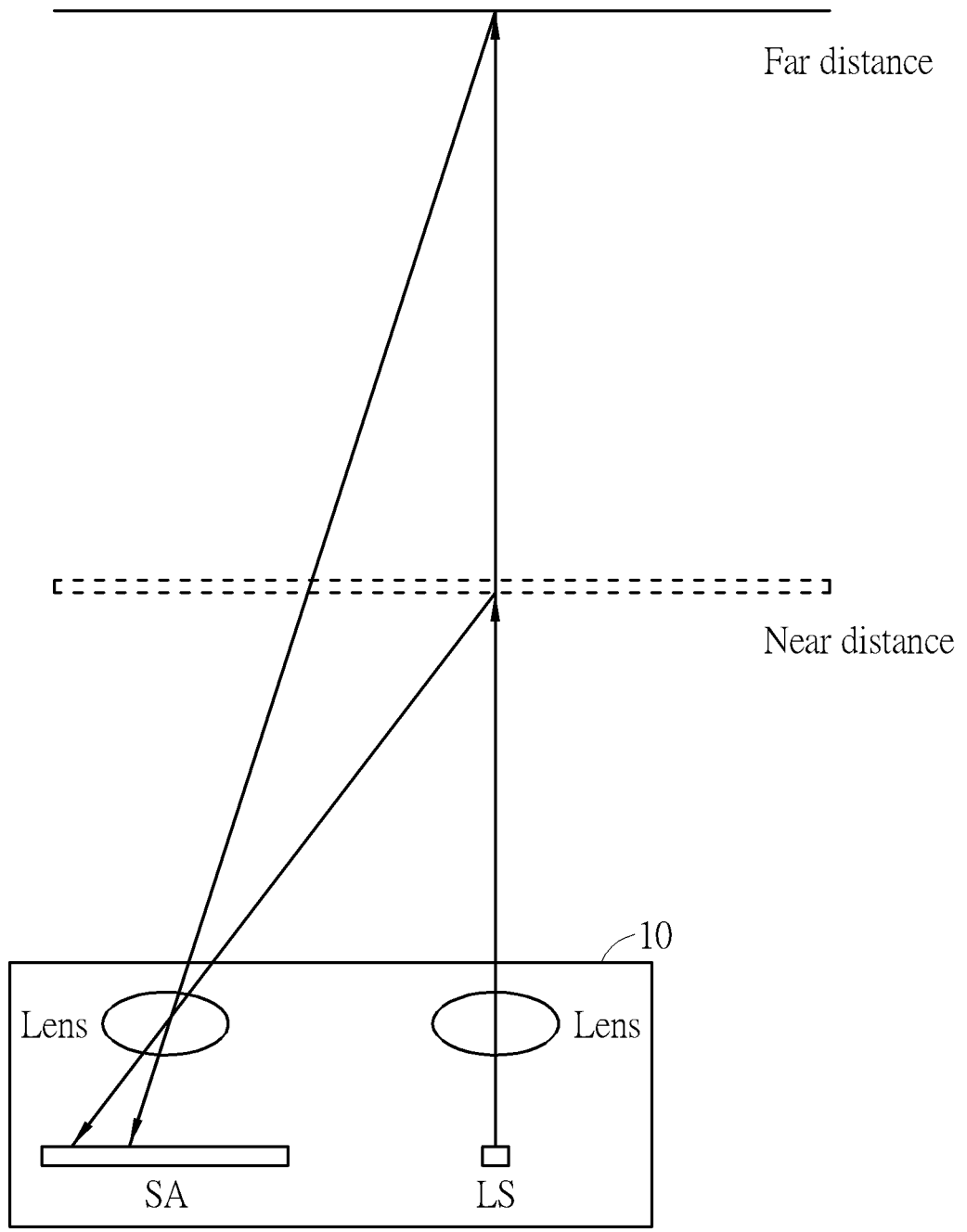
FIG. 2 is a schematic diagram of an operation method of a non-contact range finding module according to an embodiment of the present invention.

In detail, please refer to FIG. 2, which is a schematic diagram of an operation method of the non-contact range finding module 104 according to an embodiment of the present invention. The non-contact range finding module 104 includes a light source LS and a sensing area SA. The light source LS emits a light beam towards the front of the moving device 10. After the light beam hits an obstacle and the reflected light beam scatters towards the sensing area SA of the non-contact range finding module 104, a distance to the obstacle may be determined according to an imaging location.

Each of the pixels of the semantic distance map may include the obstacle information of the image captured by the monocular image capturing device 102, wherein each of the pixels includes at most a piece of obstacle information. In other words, each of the pixels of the semantic distance map includes at most a piece of obstacle information of the moving device 10.

The obstacle information includes a distance between the moving device 10 and an obstacle, a type of the obstacle and a recognition probability of the obstacle. The obstacle information of each pixel of the semantic distance map may be stored in the memory unit 106. In an example, the recognition probability may be a confidence level of a recognition result. In addition, before establishing the semantic distance map, a default type of obstacle of the single-point distance measurement result obtained by the non-contact range finding module 104 is wall.

Since the distance between the non-contact range finding module 104 and the obstacle measured by the non-contact range finding module 104 of the moving device 10 is a real distance. When an obstacle is determined in the front of the non-contact range finding module 104, the processing unit 108 is configured to set the recognition probability of the corresponding pixel to 100%. In an embodiment, an object recognition network model, e.g. Yolov4-tiny or Yolov5s of YOLO (You Only Look Once) series may be adopted to perform the object recognition to reduce overall parameters and computation demands.

After the processing unit 108 may obtain the obstacle information and an obstacle bounding box BB of the obstacle in the image after performing the recognition for the image, wherein a lowest coordinate height of the obstacle bounding box BB corresponding to a real distance to the obstacle may be determined according to a mapping table of coordinate-height-to-distance. Therefore, the processing unit 108 may determine a depth information of the obstacle according to the obstacle in the image and the single-point distance measurement result of the pixel corresponding to the image. In an embodiment, the mapping table of coordinate-height-to-distance may be stored in the memory unit 106.

Figure 3:
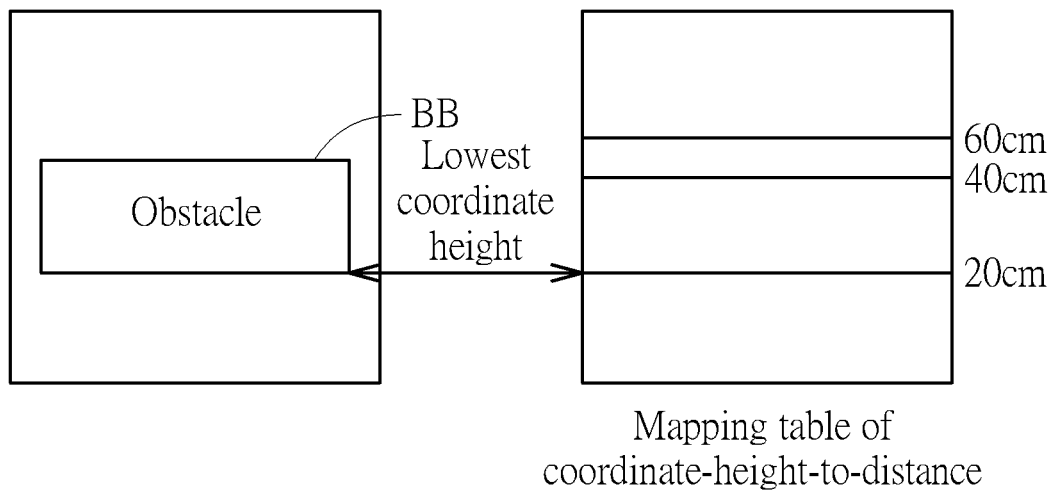
FIG. 3 is a schematic diagram of a relation between an obstacle bounding box and a real distance according to an embodiment of the present invention.

As shown in FIG. 3, the pixels in the obstacle bounding box BB may be seen as pixel locations occupied by the obstacle. The moving device 10 may determine the distance to the obstacle according to the lowest coordinate height of the obstacle bounding box BB of the object recognition result by looking up the mapping table of coordinate-height-to-distance. In the example of FIG. 3, the lowest coordinate height of the obstacle bounding box BB may correspond to 20 cm in real distance.

By the above method, the processing unit 108 may recognize whether the lowest coordinate height of the obstacle bounding box BB is lower than a highest imaging height on the ground or not to determine a ground obstacle on the ground, wherein the highest imaging height on the ground denotes a coordinate height of a horizon in the image, i.e. a coordinate height of a boundary between the ground and other places.

Figure 4:
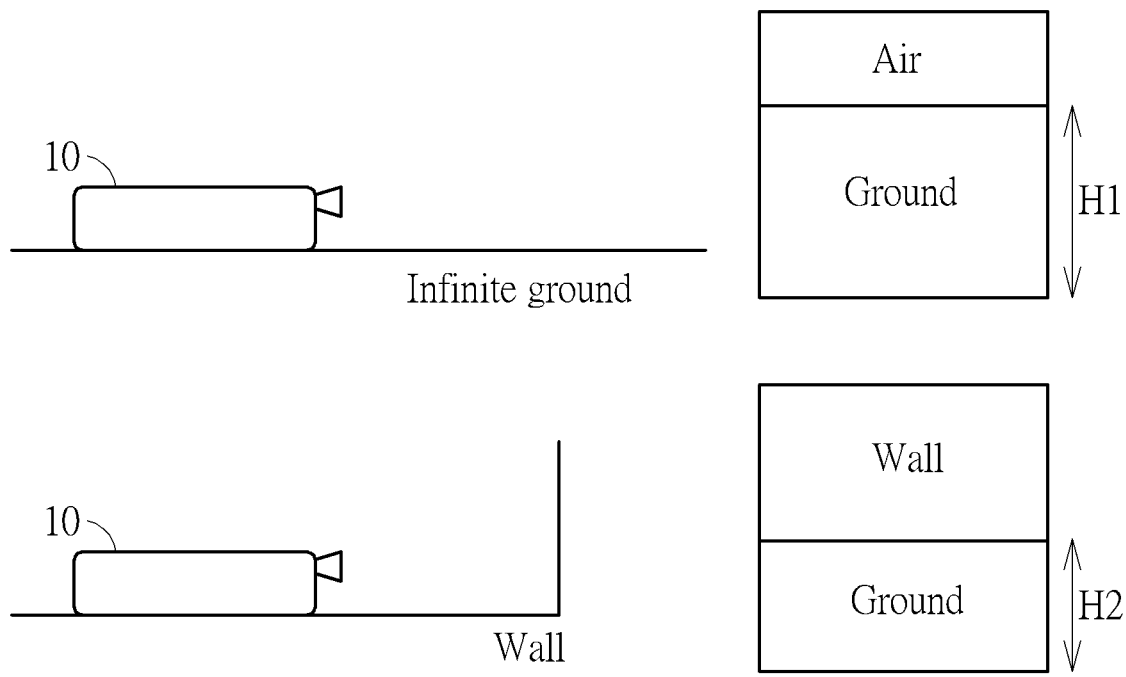
FIG. 4 is a schematic diagram of an imaging mapping relation according to an embodiment of the present invention.

In detail, please refer to FIG. 4, when no obstacle exists in front of the moving device 10, i.e. the ground is infinite far from the moving device 10, a ground imaging height of the image captured by the monocular image capturing device 102 is close to a height H1 (in pixel unit); when a wall exists in front of the moving device 10, the ground imaging height of the image captured by the monocular image capturing device 102 is close to a height H2 (in pixel unit). Therefore, when the monocular image capturing device 102 captures the images indoors, the height H2 is smaller than the height H1.

When the non-contact range finding module 104 determines that the obstacle type of the pixel is the wall, the ground imaging height H2 is determined by looking up the mapping table of coordinate-height-to-distance; in contrast, when the non-contact range finding module 104 determines that the obstacle type of the pixel is not the wall, the height H1 is equal to the height H2. Therefore, the processing unit 108 according to an embodiment of the present invention may determine the highest imaging height on the ground according to the lower value of the ground imaging height H2 and the ground imaging height H1 in the image captured by the monocular image capturing device 102.

After the processing unit 108 determines the obstacle type, the recognition probability and the distance to the obstacle, the processing unit 108 may update the recognition probability of each pixel accordingly and store the updated recognition probability to the obstacle information of the memory unit 106. In an embodiment, a formula (1) for updating the recognition probability of each pixel is:

$$p3 = \frac{p1 + p2 * (1 + \text{ratio})}{2 + \text{ratio}}, \text{ratio} = \frac{|p2 - 0.5|}{1} \quad (1)$$

wherein p3 denotes the updated recognition probability, p1 is a previous recognition probability, p2 is a current recognition probability and the ratio is a weighted value for the update. Since the formula (1) takes extreme rates, i.e. the probability close to 0% or 100%, as with higher confidence level, 50% of the probability is taken as the weighted value for the update. Therefore, the moving device 10 according to an embodiment of the present invention may rapidly recognize the objects in the image and improve a precision rate of the recognition to improve an ability of obstacle avoidance.

Notably, when the updated recognition probability is larger than or equal to a default probability, the processing unit 108 stores the corresponding obstacle information, i.e. the distance to the obstacle and the obstacle type, to the memory unit 106; in contrast, when the updated recognition probability is smaller than the default probability, the processing unit 108 does not update the corresponding obstacle information. For example, when the updated recognition probability of the pixel is larger than or equal to 65% (i.e. the default probability), the corresponding obstacle information is updated; in contrast, when the updated recognition probability of the pixel is smaller than 65% (i.e. the default probability), no corresponding obstacle information is update.

Therefore, the present invention may update all pixels in the image with the updated recognition probability to complete a global update, and the updated recognition probability, the obstacle information are updated to the memory unit 106.

Figure 5:
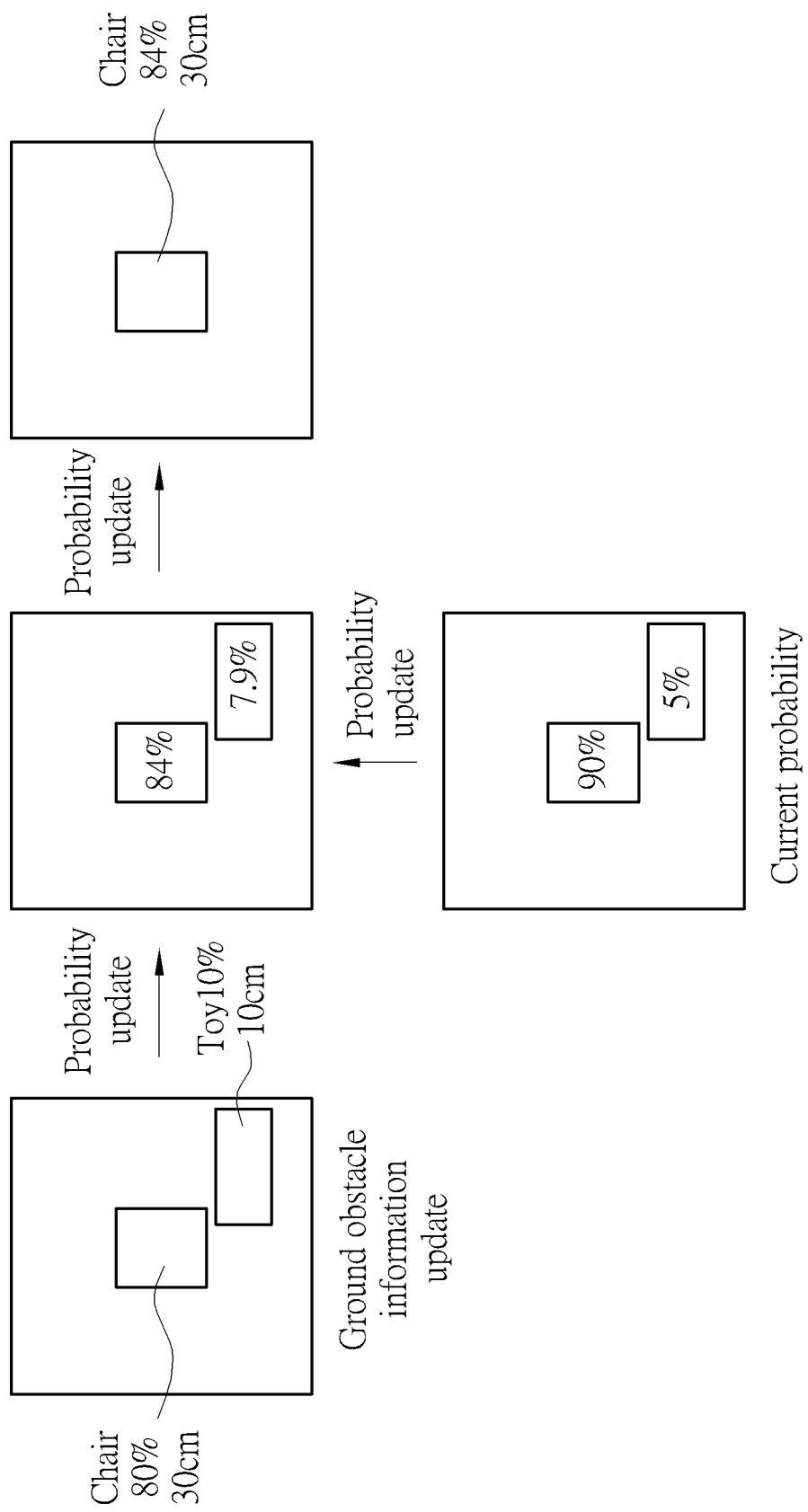
FIG. 5 is a schematic diagram of a global update according to an embodiment of the present invention.

In an embodiment, please refer to FIG. 5, which is a schematic diagram of the global update according to an embodiment of the present invention. The obstacle information on the ground stored in the semantic distance map are "Chair, 80%, 30 cm", "Toy, 10%, 10 cm" with corresponding probabilities "90%" and "5%". The processing unit 108 may obtain the updated recognition probability of the chair as 84%, the updated recognition probability of the toy as 7.9% according to the formula (1). Assume that the default probability of the updated recognition probability is 70% in this example, the updated recognition probability of the toy is 7.9% and is smaller than the default probability, i.e. 70% after the global update. Therefore, the processing unit 108 may delete the obstacle information of the toy and store "Chair, 84%, 30 cm" in the semantic distance map.

Since the distance measured by the non-contact range finding module 104 according to an embodiment of the present invention is a real distance, when the distance to the obstacle measured by the non-contact range finding module 104 is different to that determined according to the mapping table of coordinate-height-to-distance corresponding to the pixel, the distance measured by the non-contact range finding module 104 is adopted as the distance to complete a local update.

Figure 6:
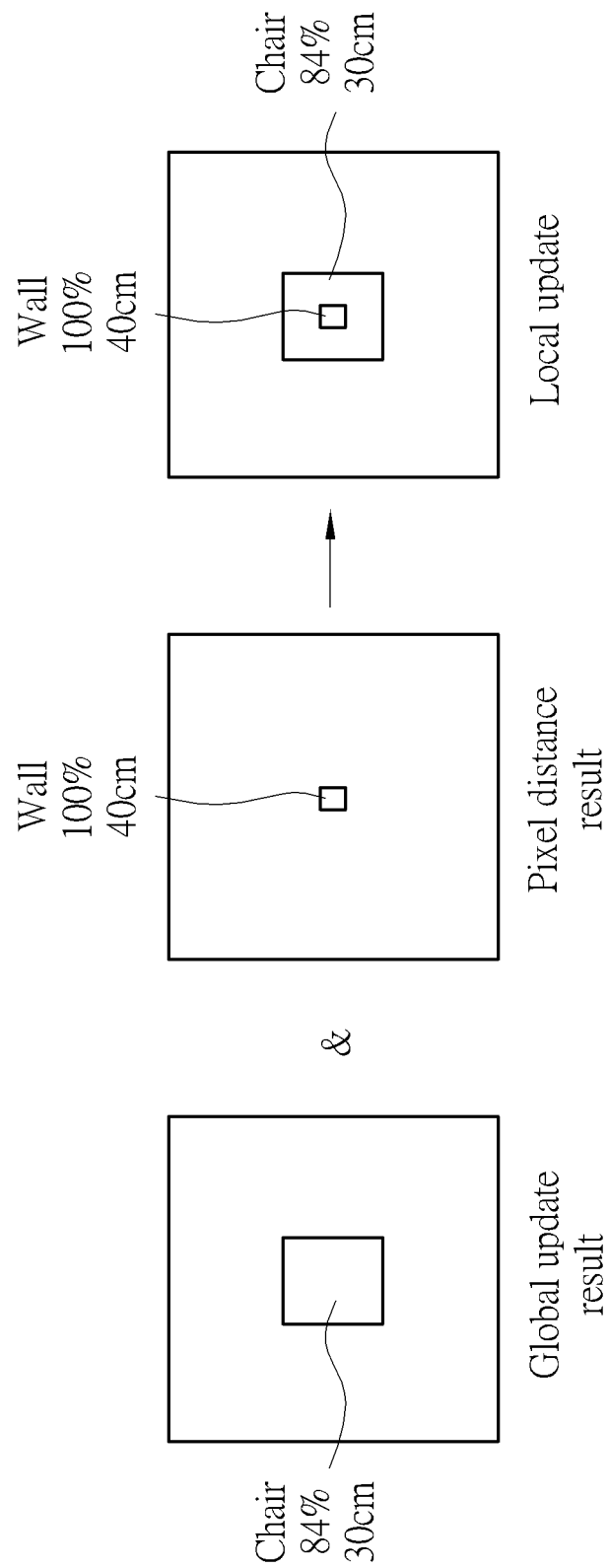
FIG. 6 and FIG. 7 are schematic diagrams of a local update according to an embodiment of the present invention.
Figure 7:
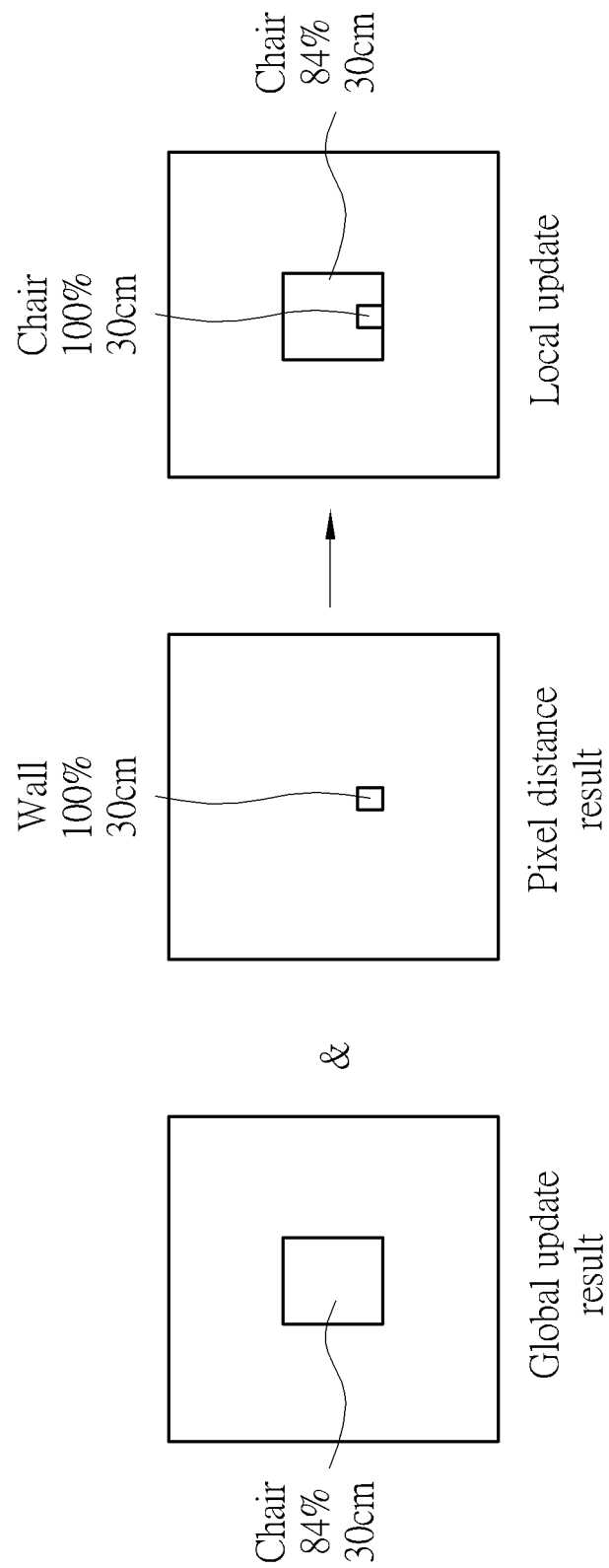

FIG. 6 and FIG. 7 are schematic diagrams of the local update according to an embodiment of the present invention. As shown in FIG. 6, a result of the global update is "Chair, 84%, 30 cm", and the pixel distance to the chair measured by the non-contact range finding module 104 is "Wall, 100%, 40 cm". That is, the wall is behind the chair, and the distance of the overlapped pixel is based on the pixel distance measured by the non-contact range finding module 104.

In another embodiment, as shown in FIG. 7, a result of the global update is "Chair, 84%, 30 cm", and the pixel distance to the chair measured by the non-contact range finding module 104 is "Wall, 100%, 30 cm". Since the distance measured by the non-contact range finding module 104 is the real distance, the distance of the overlapped pixel is based on the pixel distance measured by the non-contact range finding module 104. In the embodiment of FIG. 7, the obstacle type detected by the non-contact range finding module 104 is changed from "Wall" to "Chair".

Figure 8:
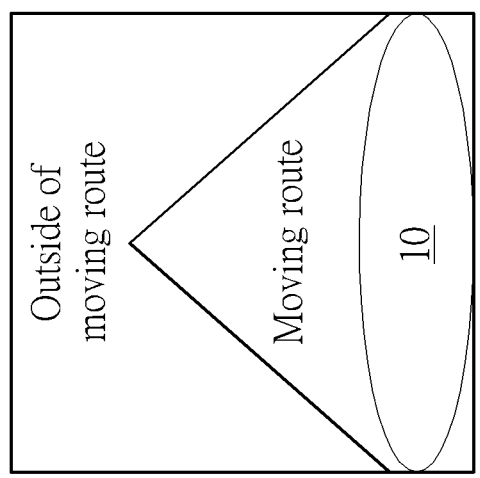
FIG. 8 is a schematic diagram of a moving route of the moving device according to an embodiment of the present invention.

After the moving device 10 finishes updating the semantic distance map, an obstacle avoidance strategy may be determined according to the semantic distance map. FIG. 8 is a schematic diagram of a moving route of the moving device 10 according to an embodiment of the present invention. As shown in FIG. 8, the moving device 10 determines pixel locations of the moving route of the moving device 10 on the semantic distance map according to an imaging width of the moving device 10, wherein the imaging width is determined by looking up the mapping table of coordinate-height-to-distance according to a width of moving device 10 with a certain distance.

Then, the moving device 10 may look up the mapping table of coordinate-height-to-distance to determine the distance to the obstacle according to the single-point distance measurement result of the non-contact range finding module 104 when performing the local update to determine whether a space exists under the obstacle or not, e.g. a height from the ground to bottom of a sofa or a cabinet, to determine an obstacle avoidance route of the moving device 10. Therefore, when pixels corresponding to the semantic distance map of the moving route of the moving device 10 existing a wall surrounded by the obstacle pixels, and the distance from the wall to the moving device 10 is larger than the distance from the obstacle to the moving device 10, the processing unit 108 of the moving device 10 may calculate an obstacle bottom level height to determine whether the moving device 10 can enter the space under the obstacle or not.

Figure 9:
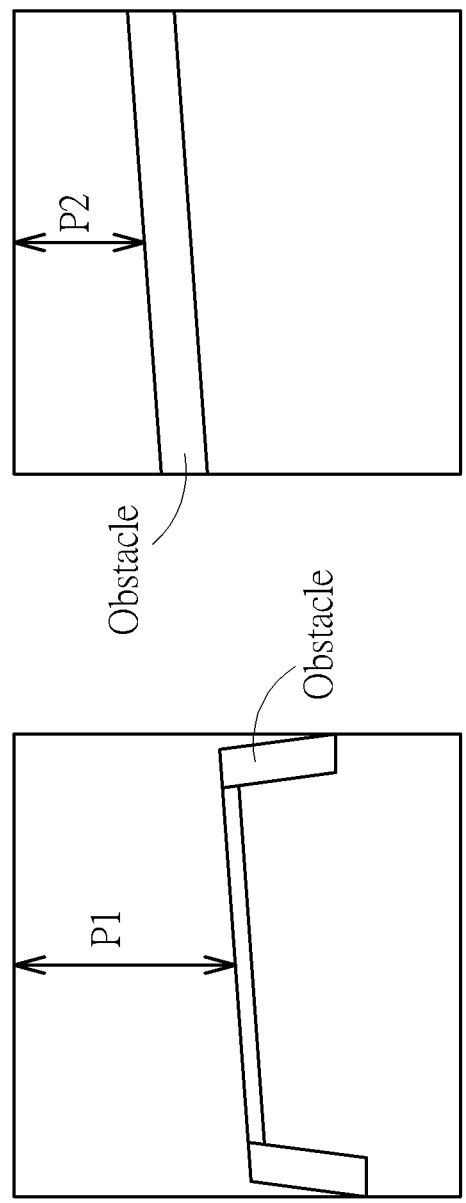
FIG. 9 is a schematic diagram of determining an obstacle bottom level height according to an embodiment of the present invention.

Please refer to FIG. 9, which is a schematic diagram of determining the obstacle bottom level height according to an embodiment of the present invention. Assume that the obstacle in FIG. 9 is a sofa, a pixel number between a bottom pixel of the sofa and an upper edge of the image captured by the monocular image capturing device 102 of the moving device 10 at a first timing with a distance D1 to the obstacle, is PN_1 pixel units. Since the obstacle is getting bigger in the image captured by the monocular image capturing device 102 when the moving device 10 is moving forward, a pixel number between the bottom pixel of the sofa and the upper edge of the image captured by the monocular image capturing device 102 of the moving device 10 at a second timing with a distance D2 to the obstacle, is PN_2 pixel units. In this situation, the distance D1 is larger than the distance D2, and the pixel number PN_1 is more than the pixel number PN_2.

Based on the distances D1, D2, the pixel numbers PN_1, PN_2 and the mapping of the monocular image capturing device 102, the processing unit 108 according to an embodiment of the present invention may calculate a real height of the bottom of the obstacle to determine whether the moving device 10 can enter the bottom space of the obstacle or not.

That is, when the bottom height of the obstacle is larger than a height of the moving device 10, the moving device 10 may neglect the distance to the obstacle and takes the distance to the wall for the obstacle avoidance, such that the moving device 10 can enter the bottom of the obstacle; in contrast, when the bottom height of the obstacle is smaller than the height of the moving device 10, the moving device 10 avoids the obstacle.

Figure 10:
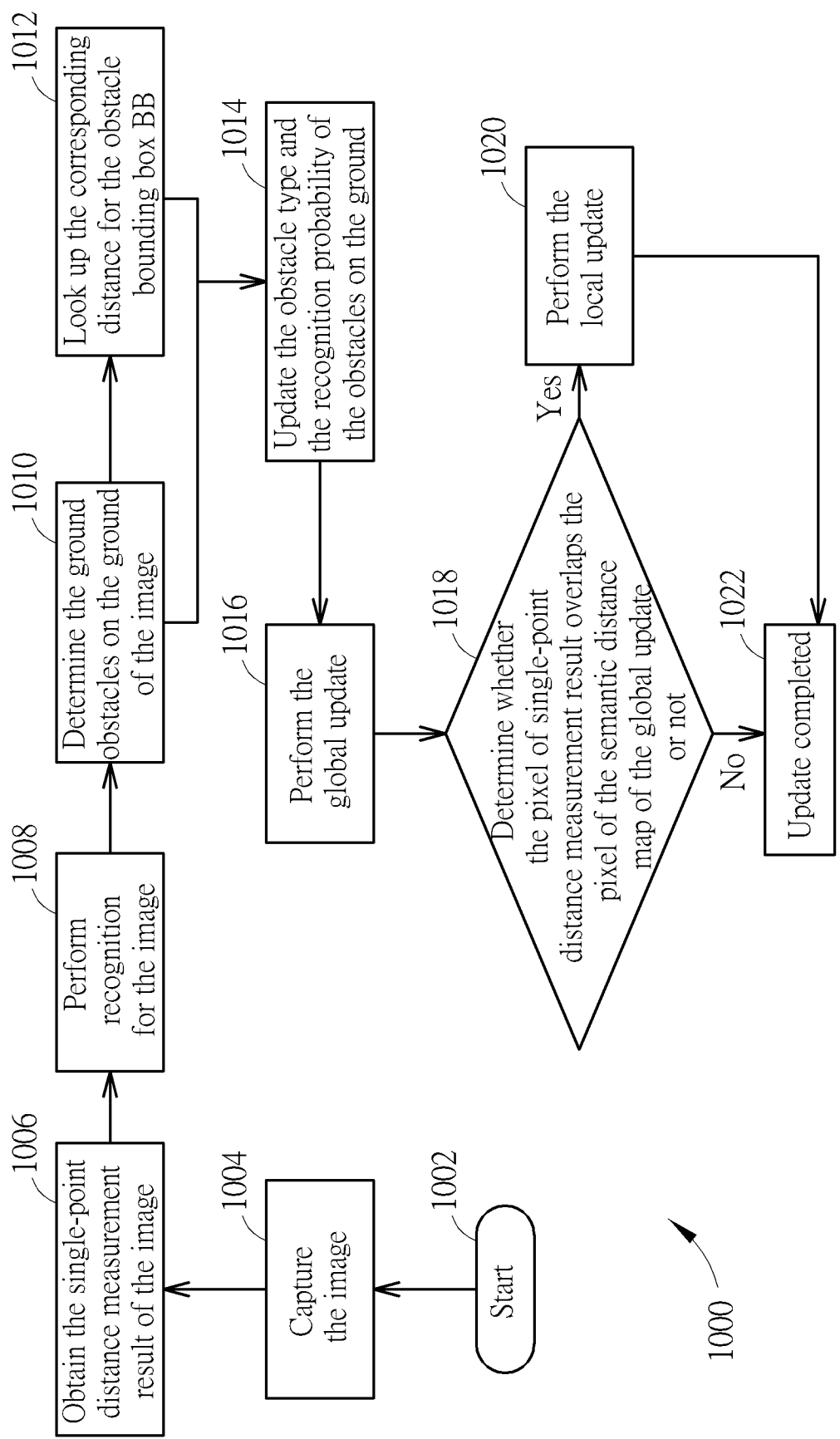
FIG. 10 is a schematic diagram of an establishing method of a semantic distance map according to an embodiment of the present invention.
Figure 11:
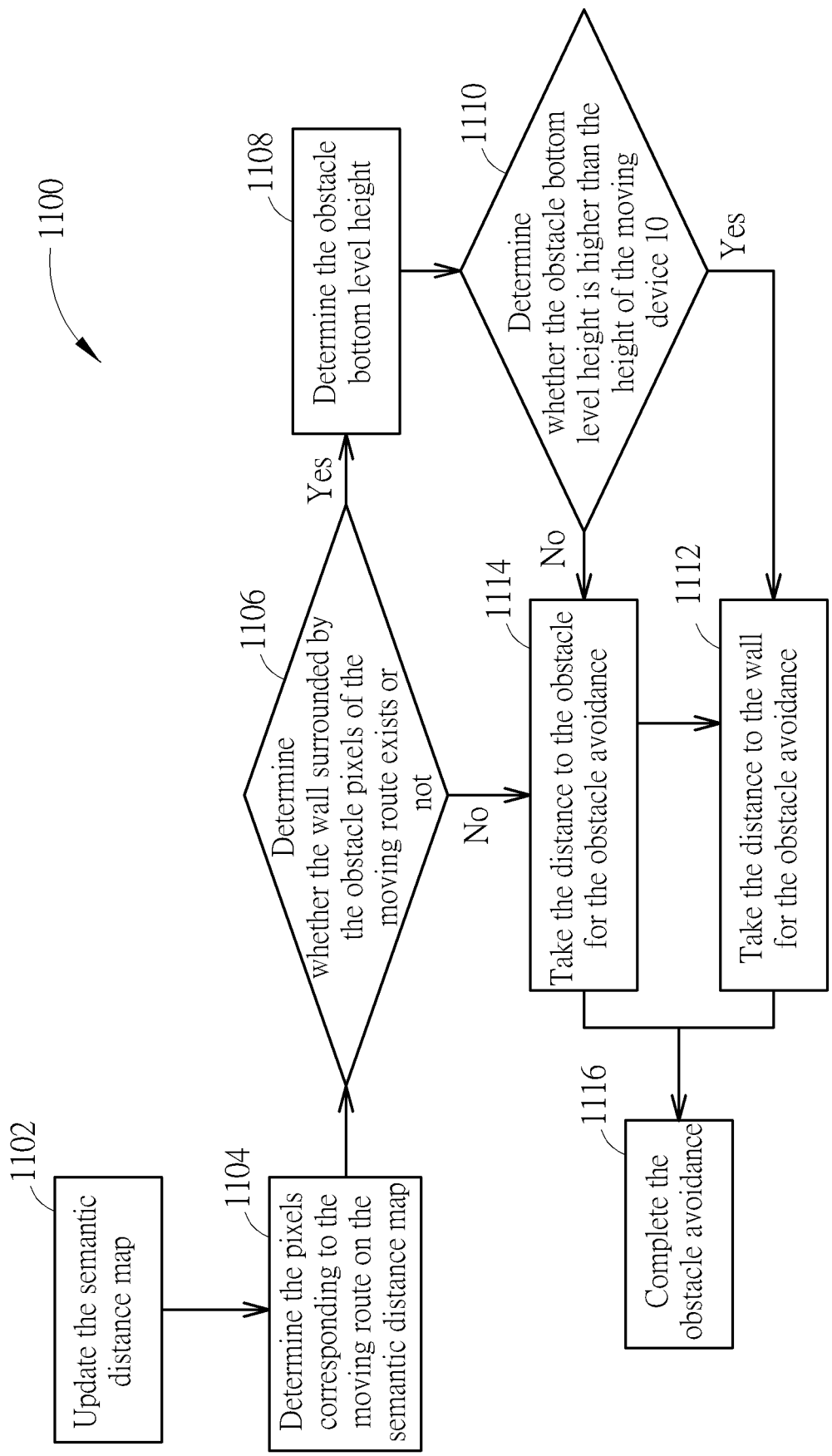
FIG. 11 is a schematic diagram of an obstacle avoidance method according to an embodiment of the present invention.

An operation of the moving device 10 may be concluded to an establishing method of a semantic distance map 1000, as shown in FIG. 10, the establishing method of a semantic distance map 1000 includes the following steps:

Step 1002: Start;
Step 1004: Capture the image;
Step 1006: Obtain the single-point distance measurement result of the image;
Step 1008: Perform recognition for the image;
Step 1010: Determine the ground obstacles on the ground of the image;
Step 1012: Lookup the corresponding distance for the obstacle bounding box BB;
Step 1014: Update the obstacle type and the recognition probability of the obstacles on the ground;
Step 1016: Perform the global update;

Step 1018: Determine whether the pixel of single-point distance measurement result overlaps the pixel of the semantic distance map of the global update or not, if yes, goes to step 1020; if no, goes to step 1022;

Step 1020: Perform the local update;

Step 1022: Update completed.

On the other hand, an operation of determining the obstacle avoidance route of the moving device when cleaning may be concluded to an obstacle avoidance method 1100, the obstacle avoidance method 1100 includes the following steps:

Step 1102: Update the semantic distance map;

Step 1104: Determine the pixels corresponding to the moving route on the semantic distance map;

Step 1106: Determine whether the wall surrounded by the obstacle pixels of the moving route exists or not, if yes, goes to step 1108; if no, goes to step 1114;

Step 1108: Determine the obstacle bottom level height;

Step 1110: Determine whether the obstacle bottom level height is higher than the height of the moving device 10, if yes, goes to step 1112, if no, goes to step 1114;

Step 1112: Take the distance to the wall for the obstacle avoidance;

Step 1114: Take the distance to the obstacle for the obstacle avoidance;

Step 1116: Complete the obstacle avoidance.

Notably, the embodiments of the present invention illustrated above may be properly modified by those skilled in the art, and are not limited thereto. For example, the moving device 10 may further include an object recognition model for performing the objection recognition for the images. In addition, the updated recognition probability or the default probability of the updated recognition probability may all be adjusted according to requirements of a user and computer system, and not limited thereto, which are all within the scope of the present invention.

In summary, the present invention provides a method for establishing semantic distance map and related moving device which reduces physical collisions according to a semantic distance map and a non-contact range finding module when the moving device is in operation and determines whether a bottom space of an obstacle exists or not to improve a convenience of the moving device with a local update method.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An establishing method of semantic distance map for a moving device, comprising:
   capturing an image;
   obtaining a single-point distance measurement result of the image;
   performing recognition for the image to obtain a recognition result of each obstacle in the image;
   determining a semantic distance map corresponding to the image according to the image, the single-point distance measurement result and the recognition result of each obstacle of in the image; and
   determining a depth information of at least an obstacle according to at least an obstacle of the image and the single-point distance measurement result corresponding to the image; and
   storing obstacle information of each pixel of the semantic distance map to corresponding pixel memory;
   wherein each pixel of the semantic distance map includes an obstacle information, which includes a distance between the moving device and an obstacle, a type of the obstacle, and a recognition probability of the obstacle;
   wherein a default obstacle of each pixel of the semantic distance map is wall.

2. The establishing method of semantic distance map of claim 1, wherein the depth information is determined according to a mapping relation.

3. The establishing method of semantic distance map of claim 1, further comprising:
   determining at least an obstacle bounding box of the image according to obstacle information of each pixel of the semantic distance map;
   determining a ground obstacle on a ground in the image; and
   determining a depth information of the ground obstacle according to a lowest coordinate height corresponding to the obstacle bounding box of the ground obstacle in the image.

4. The establishing method of semantic distance map of claim 3, wherein the step of determining the ground obstacle on the ground in the image according to obstacle information of each pixel of the semantic distance map includes:
   setting an infinite ground in the image obtained by the moving device as a first imaging height;
   determining a second imaging height of the image according to obstacle information of each pixel of the semantic distance map, wherein the second imaging height is a highest imaging height in the image;
   determining a ground imaging height according to the first imaging height and the second imaging height; and
   determining the ground obstacle on the ground of the image according to the ground imaging height and obstacle information of each pixel of the semantic distance map.

5. The establishing method of semantic distance map of claim 1, further comprising:
   updating a recognition probability of each pixel to perform a global update of the semantic distance map;
   determining whether the single-point distance measurement result of the image overlaps obstacle information of each pixel of the semantic distance map; and
   performing a local update for the semantic distance map when a single-point distance measurement result of any pixel of the image overlaps obstacle information of each pixel of the semantic distance map.

6. The establishing method of semantic distance map of claim 5, wherein the step of determining whether the single-point distance measurement result of the image overlaps obstacle information of each pixel of the semantic distance map to perform the global update includes:
   updating a recognition probability of the semantic distance map when the recognition probability corresponding to any pixel of the image is higher than a default value; and
   not updating a recognition probability of the semantic distance map when the recognition probability corresponding to any pixel of the image is lower than the default value.

7. The establishing method of semantic distance map of claim 1, further comprising:
   determining pixel locations of the semantic distance map corresponding to a moving route of the moving device;

determining an obstacle avoidance route of the moving route according to obstacle information of the semantic distance map; and determining whether a space exists under the obstacle according to the obstacle avoidance route and obstacle information of the obstacle avoidance route to determine whether or not to avoid the obstacle.

8. The establishing method of semantic distance map of claim 7, wherein the step of determining whether th4 space exists under the obstacle according to the obstacle avoidance route and obstacle information of the obstacle avoidance route to determine whether or not to avoid the obstacle includes:

determining a first distance between the moving device and a first obstacle and a first bottom pixel location of the first obstacle at a first timing;

determining a second distance between the moving device and the first obstacle and a second bottom pixel location of the first obstacle at a second timing;

determining a bottom level height of the first obstacle according to the first distance, the first bottom pixel location, the second distance and the second bottom pixel location; and determining whether or not to avoid the first obstacle according to the bottom level height of the first obstacle.

9. A moving device, comprising:

a monocular image capturing device, configured to capture an image;

a non-contact range finding module, configured to obtain a single-point distance measurement result of the image;

a processing unit, coupled to the monocular image capturing device and the non-contact range finding module, configured to perform recognition for the image to obtain a recognition result of each obstacle in the image; and determine a semantic distance map corresponding to the image according to the image, the single-point distance measurement result and the recognition result of each obstacle of in the image; and a memory unit, configured to store the semantic distance map, wherein a default obstacle of each pixel of the semantic distance map is wall;

wherein each pixel of the semantic distance map includes an obstacle information, which includes a distance between the moving device and an obstacle, a type of the obstacle, and a recognition probability of the obstacle;

wherein the processing unit is configured to determine a depth information of at least an obstacle according to at least an obstacle of the image and the single-point distance measurement result corresponding to the image; and store obstacle information of each pixel of the semantic distance map to corresponding pixel memory.

10. The moving device of claim 9, wherein the depth information is determined according to a mapping relation.

11. The moving device of claim 9, wherein the processing unit is configured to determine at least an obstacle bounding box of the image according to obstacle information of each pixel of the semantic distance map; determine a ground obstacle on a ground in the image; and determine a depth information of the ground obstacle according to a lowest coordinate height corresponding to the obstacle bounding box of the ground obstacle in the image.

12. The moving device of claim 11, wherein the processing unit is configured to set an infinite ground in the image obtained by the moving device as a first imaging height; determine a second imaging height of the image according to obstacle information of each pixel of the semantic distance map, wherein the second imaging height is a highest imaging height in the image; determine a ground imaging height according to the first imaging height and the second imaging height; and determine the ground obstacle on the ground of the image according to the ground imaging height and obstacle information of each pixel of the semantic distance map.

13. The moving device of claim 9, wherein the processing unit is configured to update a recognition probability of each pixel to perform a global update of the semantic distance map; determine whether the single-point distance measurement result of the image overlaps obstacle information of each pixel of the semantic distance map; and perform a local update for the semantic distance map when a single-point distance measurement result of any pixel of the image overlaps obstacle information of each pixel of the semantic distance map.

14. The moving device of claim 13, wherein the processing unit is configured to update a recognition probability of the semantic distance map when the recognition probability corresponding to any pixel of the image is higher than a default value; and not to update a recognition probability of the semantic distance map when the recognition probability corresponding to any pixel of the image is lower than the default value.

15. The moving device of claim 9, wherein the processing unit is configured to determine pixel locations of the semantic distance map corresponding to a moving route of the moving device; determine an obstacle avoidance route of the moving route according to obstacle information of the semantic distance map; and determine whether a space exists under the obstacle according to the obstacle avoidance route and obstacle information of the obstacle avoidance route to determine whether or not to avoid the obstacle.

16. The moving device of claim 15, wherein the processing unit is configured to determine a first distance between the moving device and a first obstacle and a first bottom pixel location of the first obstacle at a first timing; determine a second distance between the moving device and the first obstacle and a second bottom pixel location of the first obstacle at a second timing; determine a bottom level height of the first obstacle according to the first distance, the first bottom pixel location, the second distance and the second bottom pixel location; and determine whether or not to avoid the first obstacle according to the bottom level height of the first obstacle.

* * * * *